UNITED STATES PATENT OFFICE.

THOMAS MATHIESON THOM, OF CHESHUNT, ENGLAND.

MANUFACTURE OF ARTIFICIAL MARBLE AND STONE.

No. 825,088.     Specification of Letters Patent.     Patented July 3, 1906.

Application filed April 27, 1906. Serial No. 314,051.

*To all whom it may concern:*

Be it known that I, THOMAS MATHIESON THOM, lithographer, a subject of the King of Great Britain, and a resident of Woodlands, Cheshunt, in the county of Hertfordshire, England, have invented new and useful Improvements in the Manufacture of Artificial Marble and Stone, of which the following is a specification.

The present invention has reference to the manufacture of artificial marble and stone, which consists in submitting blocks or slabs of lime to the action of carbonic-acid gas in a closed vessel.

Hitherto the carbonic-acid gas has been forced into the vessel containing the slabs, and the pressure has been maintained and from time to time increased as may be necessary during the progress of the carbonation. According to the present invention the carbonic-acid gas is not used under pressure. On the contrary, the vessel containing the slabs to be carbonated is exhausted by means of a pump, and a vacuum is produced as complete as possible. When a vacuum amounting to twenty-seven inches or thereabout has been obtained, the carbonic-acid gas ($CO_2$) is admitted to the vessel until the vacuum-gage registers only about five inches (or approximately five-sixths of an atmospheric pressure) instead of twenty-seven. As the hardening of the slabs progresses the gas is taken up by the stones, and the vacuum again begins to increase and the pressure to decrease. More gas should then be admitted, so as to maintain the gage as nearly as possible at five inches vacuum, (representing approximately five-sixths of an atmospheric pressure,) and the admission of the gas should be repeated as often as necessary. When the vacuum in the vessel ceases to show an increase, it will be evident that the action of the gas on the stones has become suspended, and the latter may then be removed.

What I claim, and desire to secure by Letters Patent of the United States, is—

The process of manufacturing artificial marble and stone which consists in subjecting the slabs while in a vacuum to the action of carbonic-acid gas until the pressure of the gas in the vacuum rises to approximately five-sixths of an atmospheric pressure, and repeating or continuing the admission of the gas, if necessary, to the vacuum, to maintain said pressure substantially constant as the carbonation progresses and the carbonic-acid gas is taken up by the slabs.

In testimony whereof I have signed my name to this specification in the presence of two subscribing witnesses.

THOMAS MATHIESON THOM.

Witnesses:
    LOVELL NEWTON REDDIE,
    ALFRED S. BISHOP.